(12) United States Patent
Sasse (10) Patent No.: US 6,681,906 B1
(45) Date of Patent: Jan. 27, 2004

(54) DEVICE FOR INCREASING SHOCK ABSORPTION

(75) Inventor: Thomas Sasse, Ennepetal (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 3 days.

(21) Appl. No.: 09/613,779

(22) Filed: Jul. 11, 2000

(30) Foreign Application Priority Data

Sep. 23, 1999 (DE) .......................................... 199 45 632

(51) Int. Cl.[7] ................................................. F16F 9/48
(52) U.S. Cl. ................ 188/284; 188/322.15; 188/282.6
(58) Field of Search .............................. 188/284, 282.5, 188/282.6, 282.9, 322.15; 267/217, 221, 226

(56) References Cited

U.S. PATENT DOCUMENTS

| | | | | |
|---|---|---|---|---|
| 1,445,615 A | * | 2/1923 | Ferres .......................... 188/269 |
| 2,355,491 A | * | 8/1944 | Whisler ........................ 188/288 |
| 2,456,736 A | * | 12/1948 | Rossman ..................... 188/284 |
| 2,599,477 A | * | 6/1952 | Patriquin ..................... 188/284 |
| 3,111,201 A | * | 11/1963 | Bliven et al. ................ 188/317 |
| 3,134,460 A | * | 5/1964 | Boucier De Carbon ....... 188/88 |
| 4,004,662 A | * | 1/1977 | Sorgatz et al. .............. 188/284 |
| 4,274,515 A | * | 6/1981 | Bourcier De Carbon ... 188/269 |
| 4,796,871 A | * | 1/1989 | Bauer et al. ............. 267/64.11 |
| 5,219,414 A | * | 6/1993 | Yamaoka ..................... 188/284 |
| 6,220,406 B1 | * | 4/2001 | De Molina et al. ......... 188/275 |

FOREIGN PATENT DOCUMENTS

| DE | 1430494 | * | 4/1970 |
|---|---|---|---|
| GB | 763557 | * | 12/1956 |

* cited by examiner

*Primary Examiner*—Jack Lavinder
*Assistant Examiner*—Bradley King
(74) *Attorney, Agent, or Firm*—Max Fogiel (57) ABSTRACT

A device for increasing shock absorption by hydraulic means in the terminal section (19 & 27) of hydraulic shock absorbers with a shock-absorption piston (3) that divides the shock absorber into two compartments. The width of a channel that conveys hydraulic fluid through the piston is reduced by partly blocking the access of fluid thereto. The access comprises several individual accesses that do not mutually communicate. To ensure precise and constant increased shock absorption in the vicinity of the buffers, one or more individual accesses are completely blocked.

3 Claims, 9 Drawing Sheets

Fig. 9

DEVICE FOR INCREASING SHOCK ABSORPTION

BACKGROUND OF THE INVENTION

The present invention concerns a device for increasing shock absorption by hydraulic means in the terminal section of hydraulic shock absorbers. Devices of this genus are called decompression-stroke buffers and compression-stroke buffers.

Decompression-and-compression stroke buffers are employed to prevent the dynamics piston in a hydraulic shock absorber from traveling all the way to the end of its stroke unbraked, It has been demonstrated practical to provide such devices with hydraulic means. The entrance that the fluid enters the piston through at the end of its stroke is accordingly partly blocked by flat or pot-shaped caps. Since these structures are mounted on springs, the shock absorption at the end of the stroke will be increased.

Hydraulic decompression-and-compression stroke buffers are known from the German reference Reimpeil & Stoll, Fahrwerktechnik: Stoβ- und Schwingungsdämpfer, pages 188 to 188. They have a drawback. The evident fluid-intake surfaces, bores in the event, are partly blocked, leaving crescent-shaped open cross-sections. Tolerance, displacement, and other factors make it impossible to ensure that these cross-sections will remain precise. This particular shape makes the volume of incoming fluid and hence the level of shock absorption in the vicinity of the decompression-and-compression stroke buffer highly unstable.

SUMMARY OF THE INVENTION

The object of the present invention is accordingly to ensure precise and constant supplementary shock absorption in the vicinity of the hydraulic buffers.

The advantage of the present invention is that the precise and constant shock absorption can be reliably attained with simple components.

One particular advantage of the present invention over the prior art is that the different resilient washers or stacks thereof allow the characteristic at the exit from the decompression-and-compression stroke shock absorption intake piston to be adjusted to attain maximal or minimal absorption forces, ascending gradients, and start-up behavior as necessary, generating reproducible absorption forces while the vehicle is in operation, leading in turn to calculable performance, and contributing to safe driving.

One embodiment of the present invention will now be specified with reference to the accompanying drawing, wherein.

DESCRIPTION OF THE PREFERRED EMBODIMENTS

Hydraulic shock absorbers, especially those employed in motor vehicles, include a cylinder 1, a shock-absorption piston 3, and at least one dynamics piston 4. Pistons 3 and 4 are mounted on the leading end of a piston rod 2 that travels back and forth inside cylinder 1. The cylinder is completely occupied by shock-absorption fluid and divided by the pistons into two compartments 5 and 6. The device also includes resilient washers .7 and 8 or stacks thereof that act as valves, resilient washer or stack 7 when dynamics piston 4 travels in one direction and resilient washer or stack 8 when it travels in the other direction and accordingly generate the desired shock-absorption forces by alternately blocking the exits of individual non-connected sections of fluid-conveying channels 9 and 10 that extend through dynamics piston 4. Channels 9 and 10 are conventionally equal in number, shape, and diameter. They differ in the present case in that they slope at a different angle to the longitudinal axis of piston rod 2. This feature allows resilient washers 7 and 8 to block only the, inner, exits of channels 9 and 10, while leaving the, outer, entrances open. Dynamics pistons of other designs, and other types of valve, finger-shaped for example, can alternatively be employed.

Figure 1:
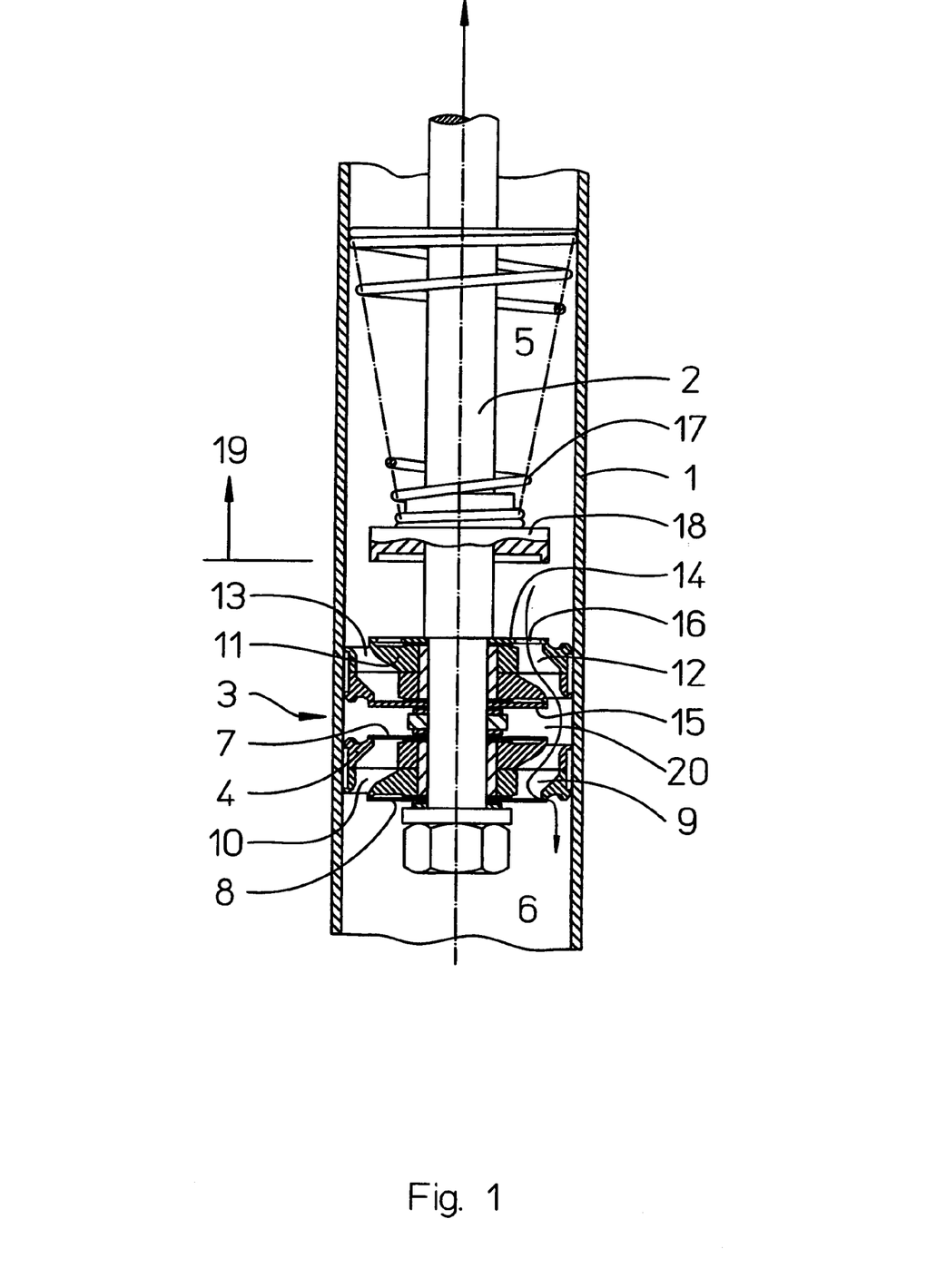
FIG. 1 illustrates a hydraulic decompression-stroke buffer out of operation, FIG. 2 a hydraulic decompression-stroke buffer in operation, FIG. 3 a hydraulic compression-stroke buffer out of operation, FIG. 4 a hydraulic compression-stroke buffer in operation, FIG. 5 a hydraulic decompression-and-compression stroke buffer out-of operation, FIG. 6 a hydraulic decompression-and-compression stroke buffer with the decompression-stroke buffer in operation, FIG. 7 a hydraulic decompression-and-compression stroke buffer with the compression-stroke buffer in operation, FIG. 8 the decompression-stroke buffer illustrated in FIG. 1 operating soft, and FIG. 9 the decompression-stroke buffer illustrated in FIG. 3 operating soft.
Figure 2:
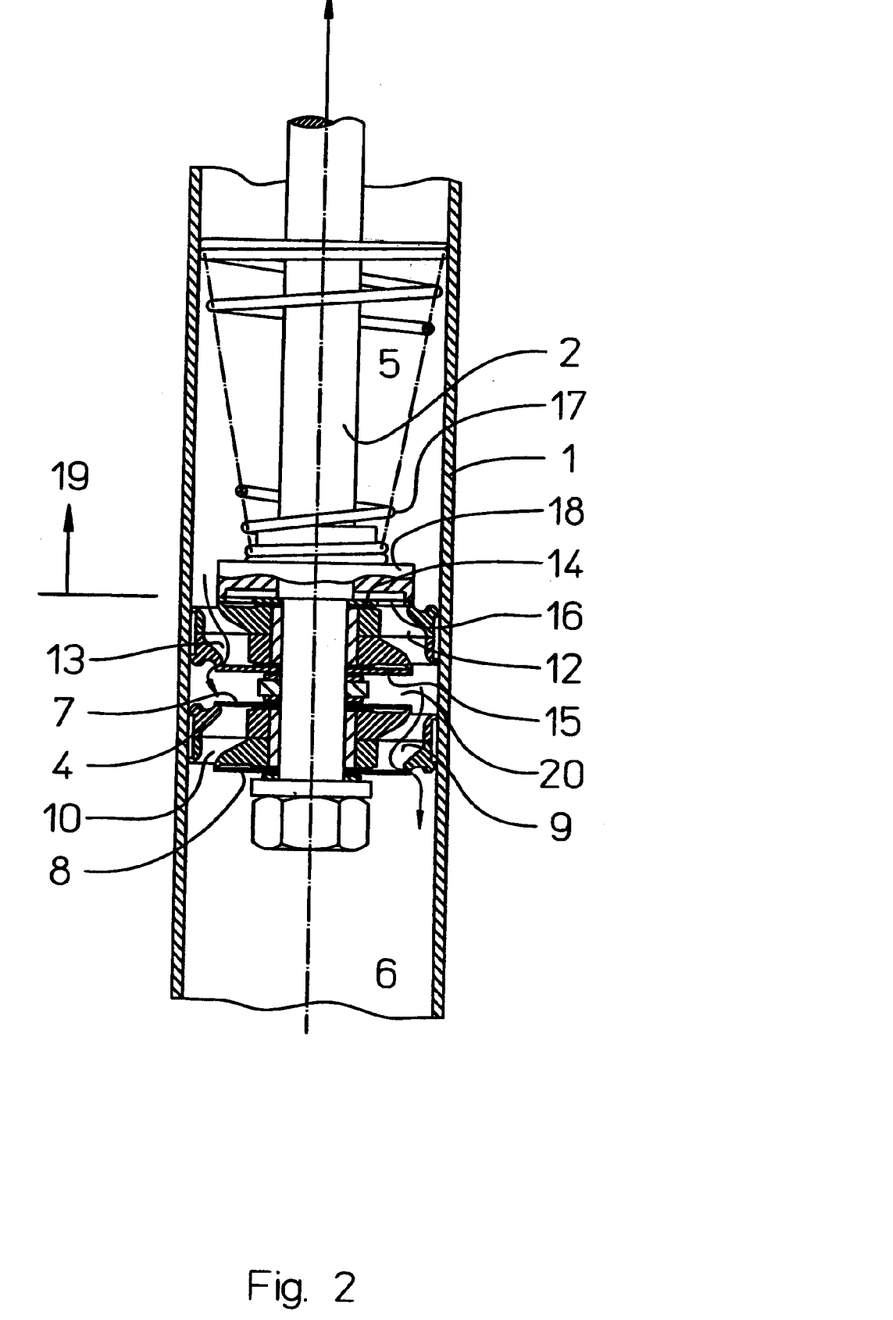

FIGS. 1 and 2 illustrate a hydraulic decompression-stroke buffer. Mounted on the end of piston rod 2 next to dynamics piston 4 is a fluid-intake piston 11 of the identical design. The exits of the fluid-conveying channels or flow surfaces 12 and 13 are blocked by resilient washers 14 and 15. The resilient washer 14 in fluid-intake 11 that faces away from dynamics piston 4, however, is provided with ports 16. A compression spring 17 at the emerging end of the piston rod rests against cylinder 1 at the outer end of the piston rod 1. Mounted on the other end is a cover with a cover plate or a cap 18.

FIG. 1 represents piston rod 2 and shock-absorption piston 3 in their dynamics state, the shock absorber in normal operation. FIG. 1 illustrates the situation with the hydraulic fluid flowing in the decompression direction with piston rod 2 leaving cylinder 1. The pressure in upper compartment 5 is higher than the pressure in lower compartment 6, forcing fluid out of the upper and into the lower compartment. Since the upper resilient washer 14 in fluid-intake piston 11 is provided with the aforesaid ports 16, the fluid can reach unimpeded the entrances into dynamics piston 4 through the fluid-conveying channel 12 in fluid-intake piston 11 until shock-absorption piston 3 arrives in the terminal section 19 of the device occupied by compression spring 17, The dynamic shock absorption in the decompression direction is controlled by the structure of the resilient washer 8 on dynamics piston 4.

Once shock-absorption piston 3 has arrived in the section 19 reserved for the hydraulic decompression-stroke buffer as represented in FIG. 2 with fluid-intake piston 11 resting against cap 18 over compression spring 17, the intake opening in the fluid-conveying channel 12 in fluid-intake piston 11 will be blocked as cap 18 closes the ports 16 through resilient washer 14. The fluid will accordingly flow through the fluid-conveying channel 13 that extends in from the outside through fluid-intake piston 11 and is blocked by resilient washer 15. The fluid will then flow into the intake opening into the fluid-conveying channel 9 in dynamics piston 4 through intermediate space 20. Since resilient washers 15 and 8 generate impedance, the hydraulic shock absorption in terminal section 19 will be facilitated along with the operation of the decompression-stroke buffer.

Figure 3:
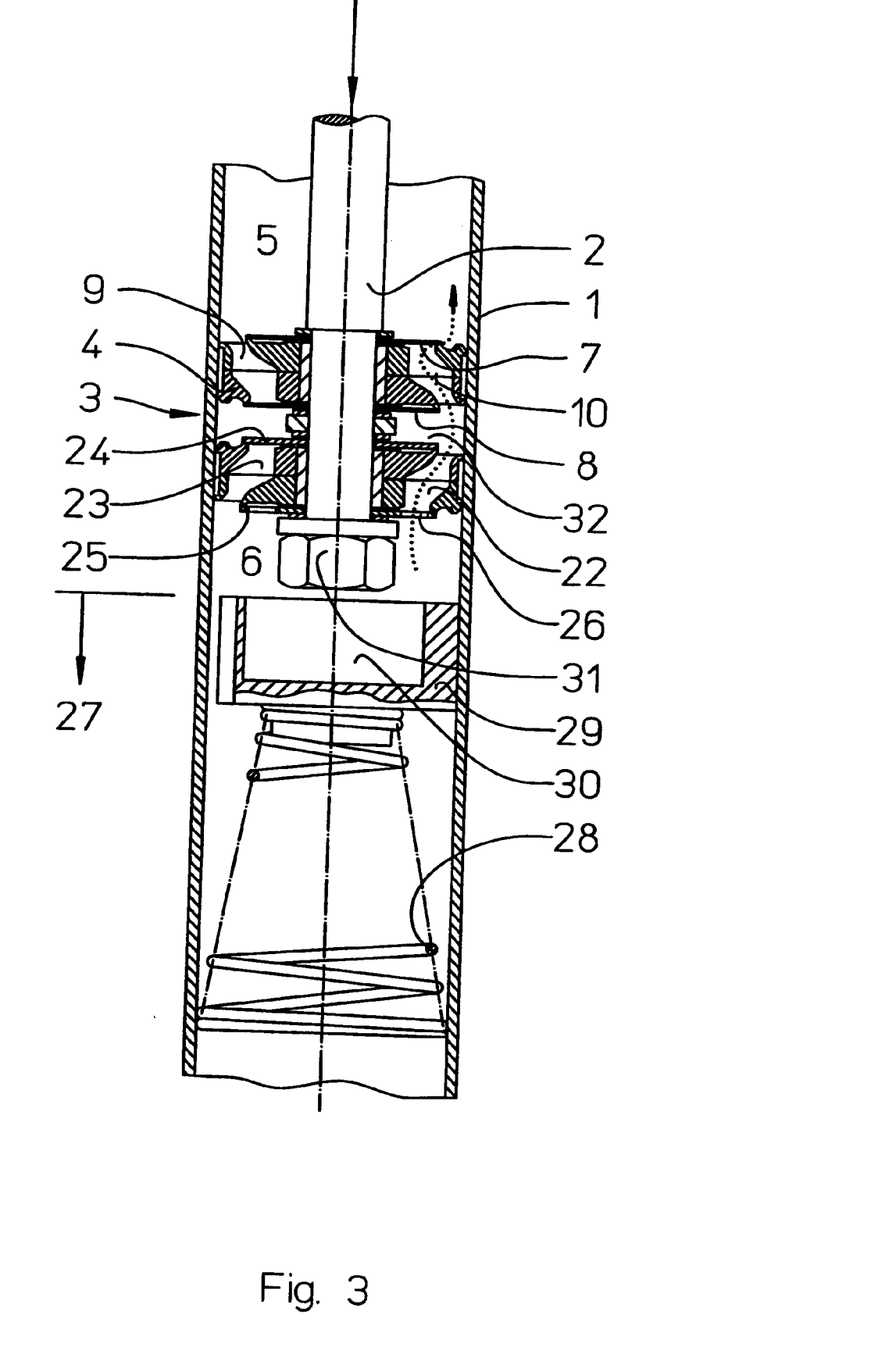
Figure 4:
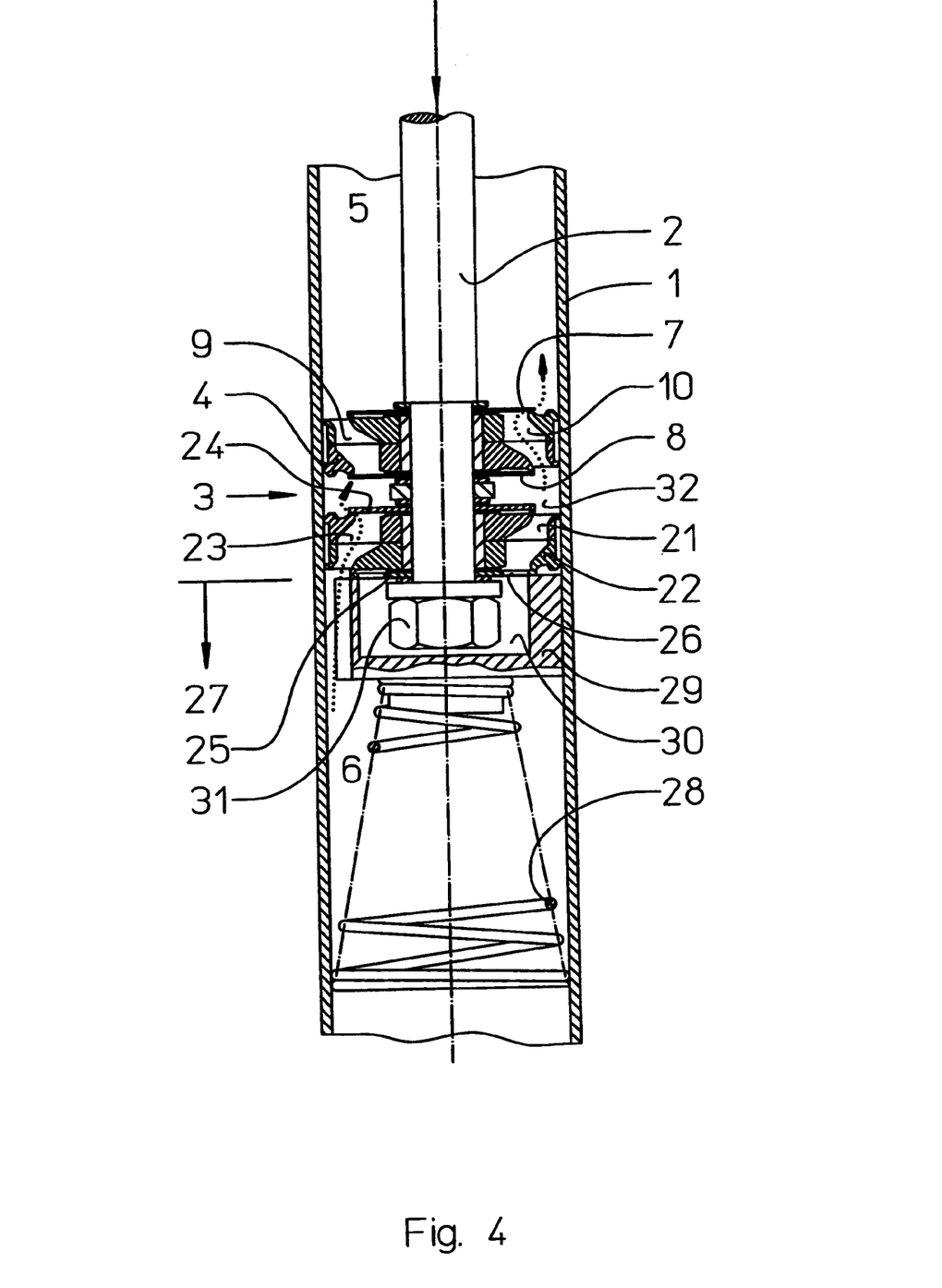

FIGS. 3 and 4 illustrate a hydraulic compression-stroke buffer in accordance with the present invention. It features an intake piston 21 with differing fluid-conveying channels 22 and 23 accommodated below a dynamics piston 4 near the end of the piston rod. Fluid-conveying channels 22 and 23 are blocked inside by resilient washers 24 and 25. The resilient washer 25 near the end of the piston rod in this embodiment is provided with ports 26. A terminal section 27, intended in the present event for hydraulic compression-stroke buffer, is occupied by a compression spring 28 that rests against the wall of cylinder 1 at the end facing away from it. At the opposite end of the compression:spring is a pot-shaped cap 29 with a depression 30 for accommodating a nut 31 that secures shock-absorption piston 3 to piston rod 2.

With the shock absorber in normal operation, as represented in FIG. 3 for instance with piston rod 2 entering cylinder 1, the pressure in lower compartment 6 will increase to a level above that of the pressure in upper compartment 5. The difference will force fluid out of compartment 6 and into compartment 6 through dynamics piston 4. The ports through resilient washer 25 will allow the fluid to flow through the fluid-conveying channels 22 in intake piston 21 unimpeded and subsequently through the fluid-conveying channel 10, only weakly blocked by resilient washer 7, in dynamics piston 4. Once shock-absorption piston 3 has arrived in compression-end terminal section 27 with cap 29 resting against the inner intake openings in intake piston 21 as illustrated in FIG. 4, fluid-conveying channel will be blocked. The fluid must now flow through fluid-conveying channel 23, which is weakly blocked by resilient washer 24. The fluid will now flow by way of intermediate space 32 to the intake opening, weakly blocked by resilient washer 7, in the fluid-conveying channel 10 in dynamics piston 4. The total impedance exerted by resilient washers 7 and 4 will generate the desired increased hydraulic shock absorption on the part of the compression-stroke buffer.

Figure 5:
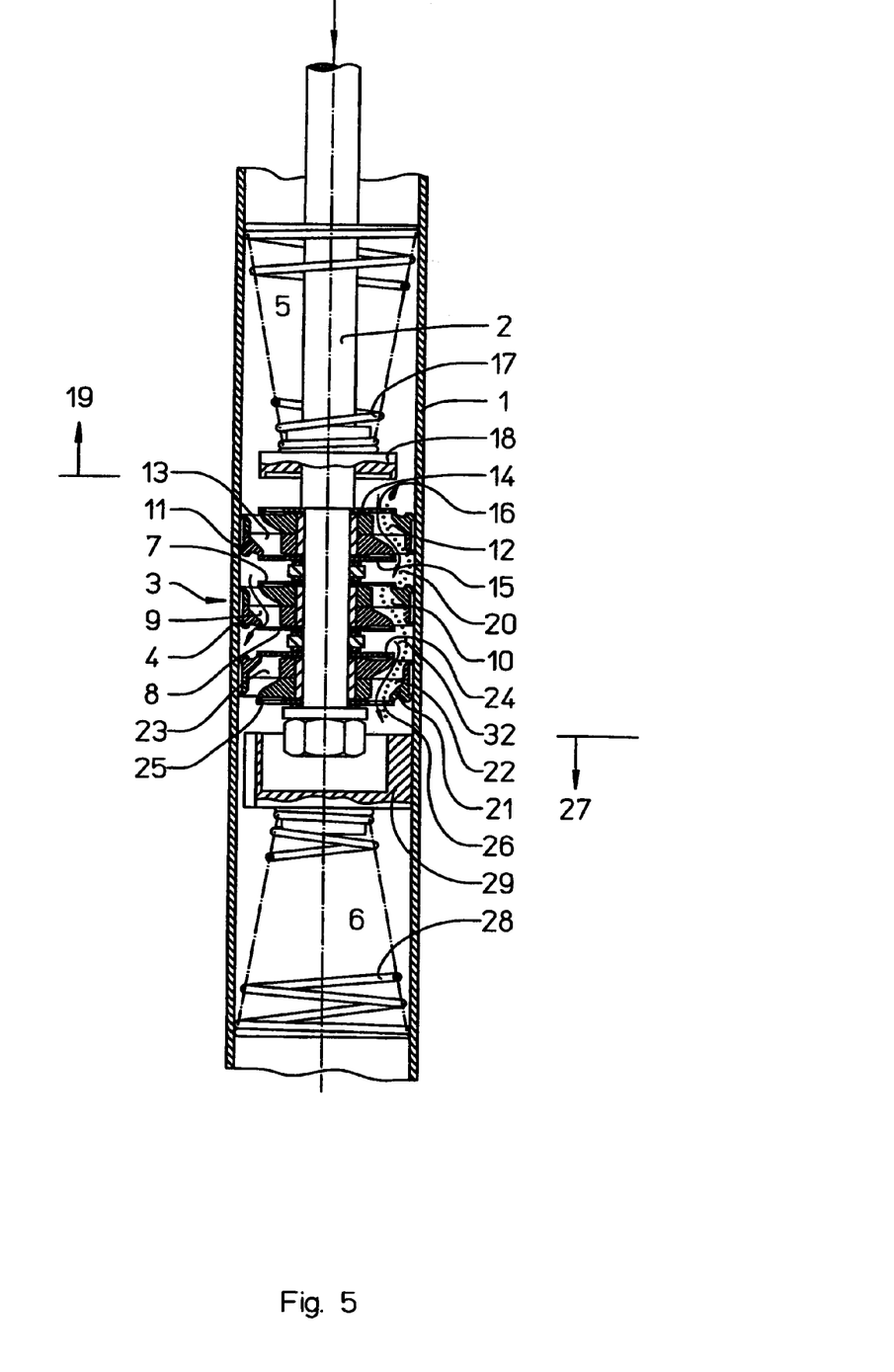
Figure 6:
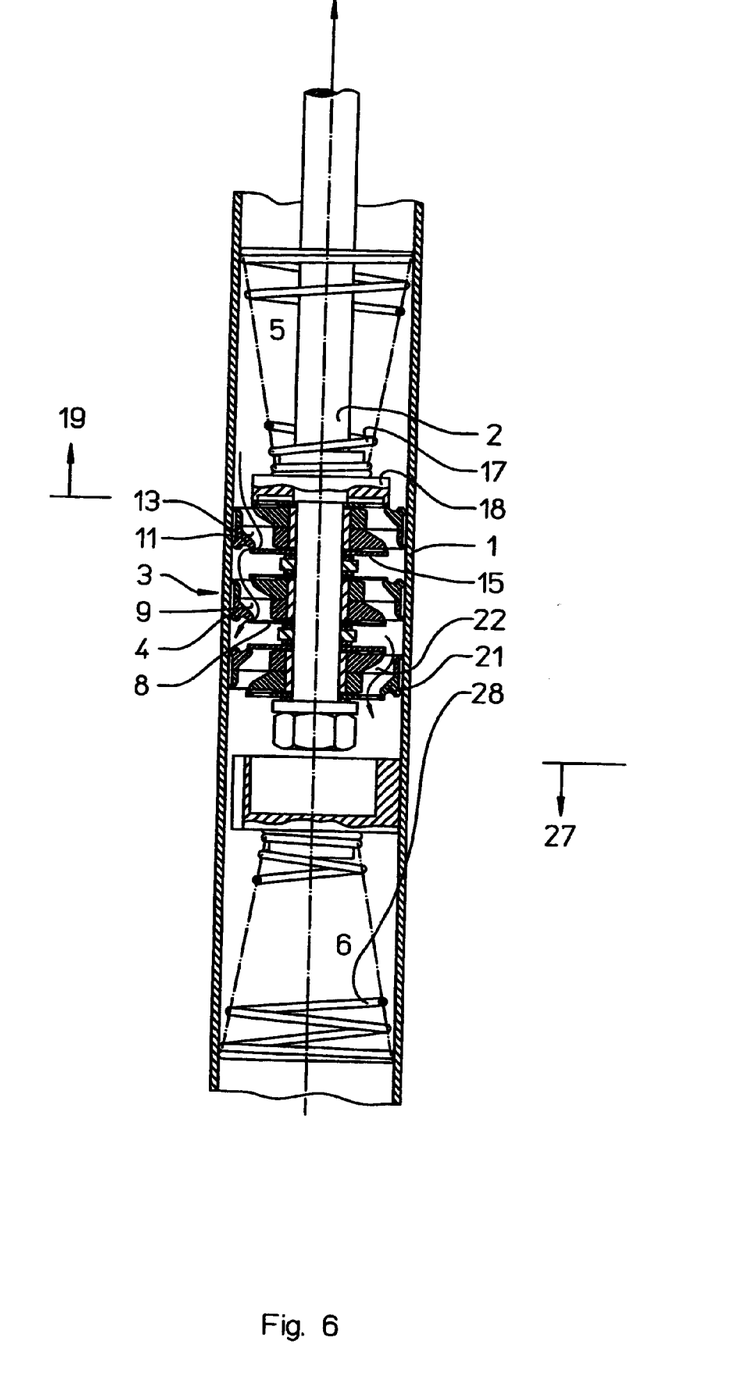
Figure 7:
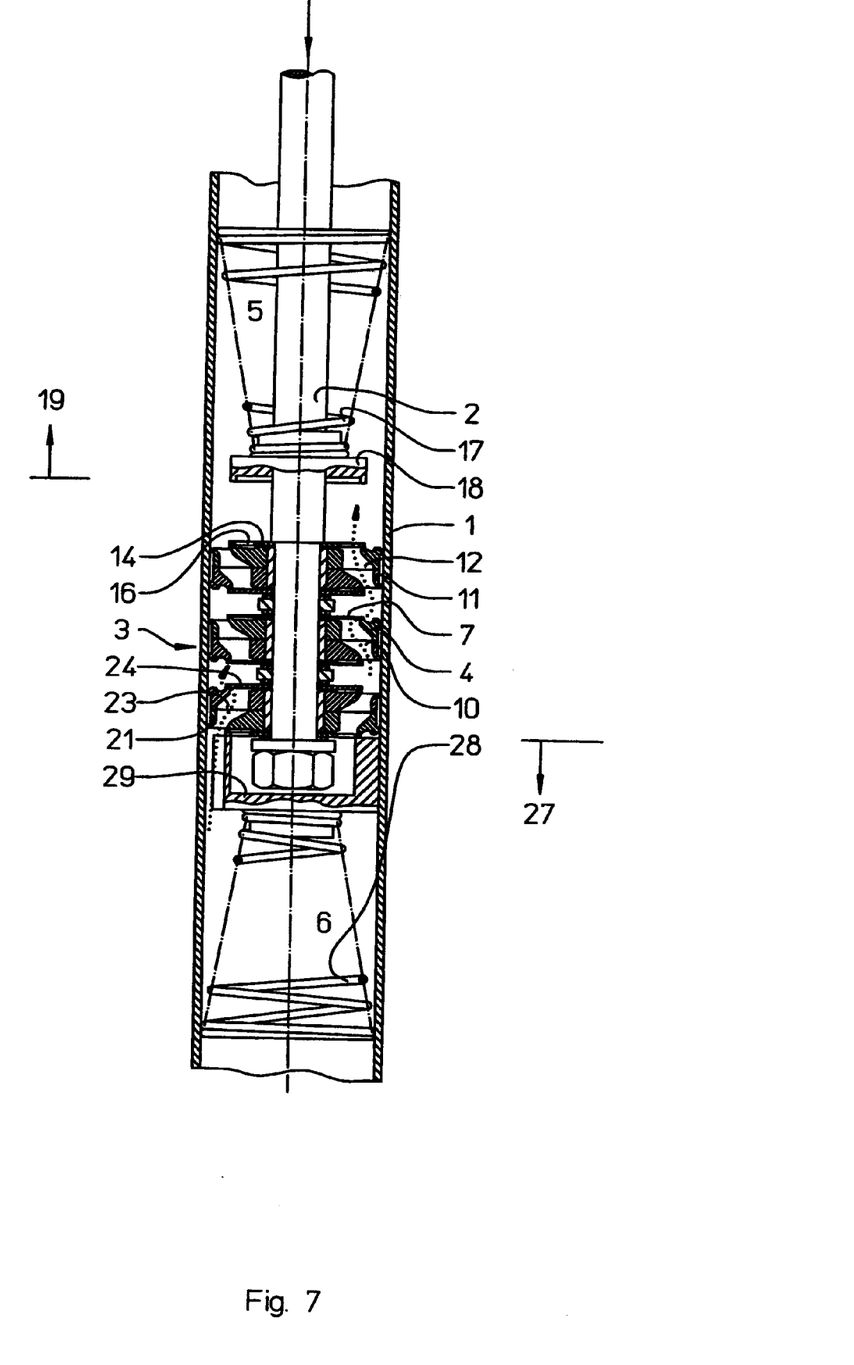

FIGS. 5 through 7 illustrate a hydraulic shock absorber with a hydraulic compression-stroke buffer and a hydraulic decompression-stroke buffer. The decompression piston end shock-absorption piston 3 in this embodiment is constituted by a dynamics piston 4 that is positioned at the middle of the device with one fluid-intake piston 11 at one end and another intake piston 21 at the other. This embodiment has two terminal sections. Terminal section 19 is occupied by a compression spring 17 with a flat cap 18, and terminal section 27 by a compression spring 28 with a pot-shaped cap 29.

With the shock absorber in normal operation, piston rod 2 and hence shock-absorption piston 3 traveling in and out as illustrated in FIG. 5, the fluid can flow unimpeded through fluid-conveying channels 12 by way of fluid-intake piston 11 and through fluid-conveying channels 22 by way of intake piston 21 because ports 16 and 28 are not blocked by resilient washers 14 and 26. Only the resilient washers 7 and 8 now control the level of shock absorption established by shock-absorption piston 3 as it travels in and out.

As shock-absorption piston 3 enters the terminal section 19 associated with hydraulic decompression-stroke buffer as illustrate in FIG. 6, the intake openings into the fluid-conveying channels 12 in fluid-intake piston 11 will be blocked as heretofore specified with reference to FIG. 2. The fluid will then flow subject to a more powerful impedance through the fluid-conveying channel 13, blocked by the resilient washer 15, in fluid-intake piston 11. Since, as will be evident from FIG. 6, the ports 26 through resilient washer 25 allow free flow through fluid-conveying channels 22, the fluid leaving dynamics piston 4, its flow attenuated by resilient washer 8, can now flow unimpeded through intake piston 21.

Once shock-absorption piston 3 has entered its associated terminal section 27, the operation of the hydraulic compression-stroke buffer illustrated in FIG. 7 is similar to that of the hydraulic compression-stroke buffer illustrated in FIG. 4. Since the intake openings into the fluid-conveying channels 22 in intake piston 21 are now blocked, the fluid will overcome the impedance exerted by resilient washer 24 and flow through fluid-conveying channels 23. Once the fluid has been distributed in intermediate space 32, it will overcome the impedance exerted by resilient washer 7 and flow through dynamics piston 4 and subsequently, without encountering any particular impedance, through fluid-intake piston 11.

Figure 8:
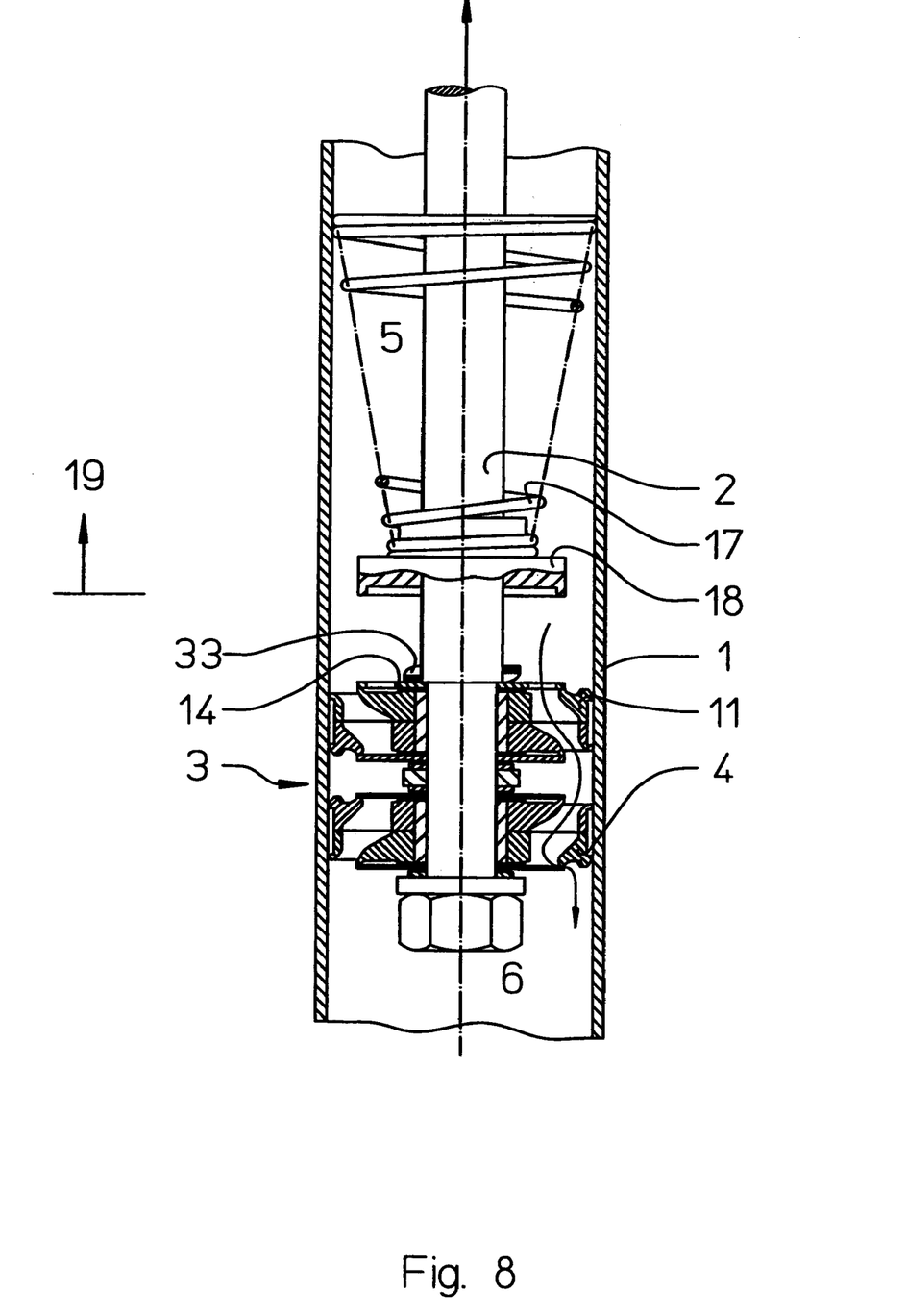
Figure 9:
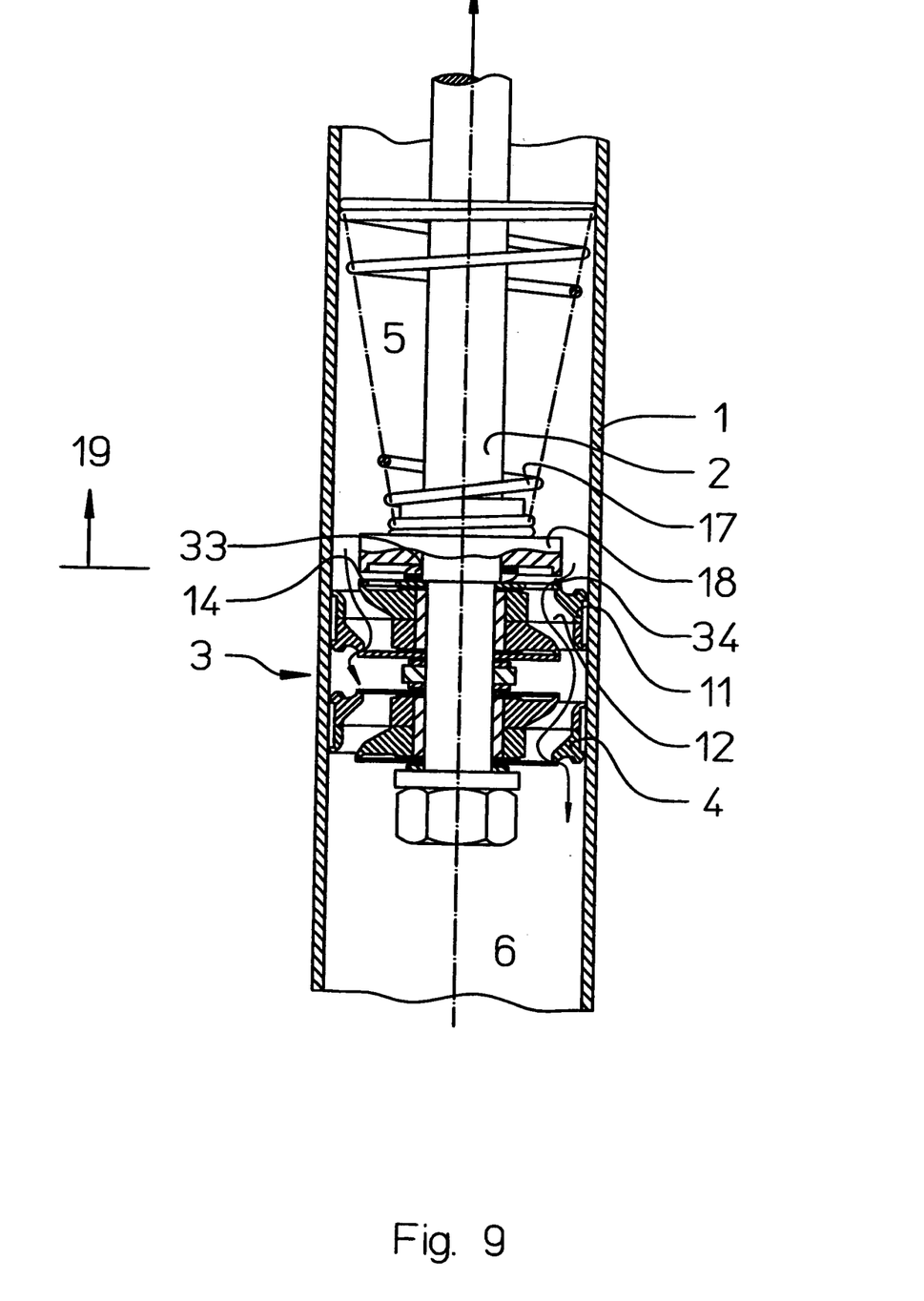

FIG. 8 is similar to FIG. 1, This embodiment features between flat cap 18 and fluid-intake piston 11 an axially compressible spring 33 that can as illustrated be an undulating spring. Once shock-absorption piston 3 has entered the terminal section 19 associated with hydraulic decompression as illustrated in FIGS. 2 and 9, the cap 18 at the bottom of compression spring 17 will come to rest against spring 33, leaving a gap 34 between the cap and the washer 14 resting against fluid-intake piston 11 that can throttle the flow of fluid out of upper compartment 5 and into fluid-conveying channel 12.

The more powerfully shock-absorption piston 3 is forced against compression spring 17, the more powerful will be the pressure exerted on cap 18 and hence on spring 33 by compression spring 17. Gap 34 will accordingly decrease continuously and finally disappear once compression spring 17 has entered the blocking state. The decrease in gap 34 as a function of the compression of compression spring 17 depends on the design of the spring and on that of spring 33. The gap can accordingly alternatively disappear before compression spring 17 has been compressed into its blocking state.

Individual accesses 11*d* can be located in at least two mutually separate annular zones 11*a*, 11*b*, one inside the other. The zones can be separated by a ring-shaped region 11*c* with smooth edges 11*e*.

List of Parts 1. cylinder
2. piston rod
3. shock-absorption piston
4. dynamics piston
5. upper compartment
6. lower compartment
7. resilient washer
8. resilient washer
9. fluid-conveying channel
10. fluid-conveying channel
11. fluid-intake piston
12. fluid-conveying channel
13. fluid-conveying channel
14. resilient washer
15. resilient washer 16. port
17. compression spring
18. flat cap
19. terminal section
20. intermediate space
21. intake piston
22. fluid-conveying channel
23. fluid-conveying channel
24. resilient washer
25. resilient washer
26. port
27. terminal section
28. compression spring
29. pot-shaped cap
30. depression
31. nut
32. intermediate space
33. spring
34. gap

What is claimed is:

1. An arrangement for increasing shock absorption by hydraulic means in a terminal section of hydraulic shock absorbers comprising:

a damping piston dividing an interior damping space into two chambers, said damping piston comprising a dynamics piston and at least one fluid-intake piston; said dynamics piston having a plurality of fluid conveying channels, the fluid conveying channels of said dynamics piston being covered by resilient washers; said at least one fluid-intake piston having fluid conveying channels arranged in at least two non-contacting ring-shaped regions lying within each other, the fluid conveying channels comprising a first channel and a second channel;

covering means for increasing shock absorption, said covering means comprising a covering plate arranged at an end of a spring, wherein fluid flows unimpeded through said first channel when spaced from said covering plate, said first channel becoming closed and said second channel becoming open when said at least one fluid-intake piston contacts said covering plate, wherein fluid flows through said second channel against a first resistance provided by a first resilient washer of the at least one fluid-intake piston, and fluid flows through one of said fluid conveying channels of said dynamics piston against a second resistance provided by one of said resilient washers of said dynamics piston, whereby said first resistance and said second resistance provide increased shock absorption.

2. The arrangement as defined in claim 1, wherein said fluid conveying channels of said dynamics piston have sections sloping at different angles to a longitudinal axis of said piston.

3. The arrangement as defined in claim 1 wherein said dynamics piston has a different function from the fluid-intake piston.

* * * * *